C. L. FORTIER.
THERMOSTAT AND LIKE DEVICE.
APPLICATION FILED OCT. 31, 1913.

1,109,981.

Patented Sept. 8, 1914.

Witnesses

Inventor
Charles L. Fortier,
By Dodge and Sons.
Attorney

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

THERMOSTAT AND LIKE DEVICE.

1,109,981.   Specification of Letters Patent.   Patented Sept. 8, 1914.

Application filed October 31, 1913. Serial No. 798,492.

*To all whom it may concern:*

Be it known that I, CHARLES L. FORTIER, a citizen of the United States, residing at Milwaukee, in the county of Milwaukee and State of Wisconsin, have invented certain new and useful Improvements in Thermostats and like Devices, of which the following is a specification.

This invention relates to thermostats, hygrostats and similar automatic control devices, particularly those of the pressure motor type.

The purpose of the invention is to free the thermostat, hygrostat or other responsive element from excessive stress occasioned by abnormal variations of temperature, humidity, etc., beyond the control of the device, and to improve the form and arrangement of the valve actuated by such responsive device.

I illustrate the invention as applied to a thermostat in the accompanying drawing, in which:—

Figure 1:
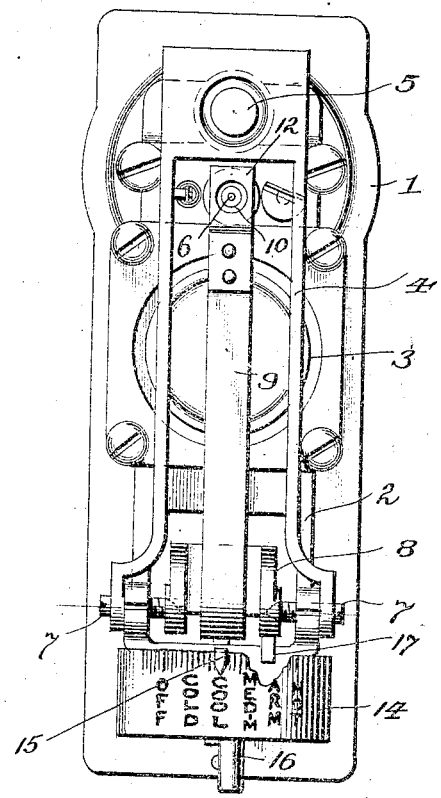
Figure 2:
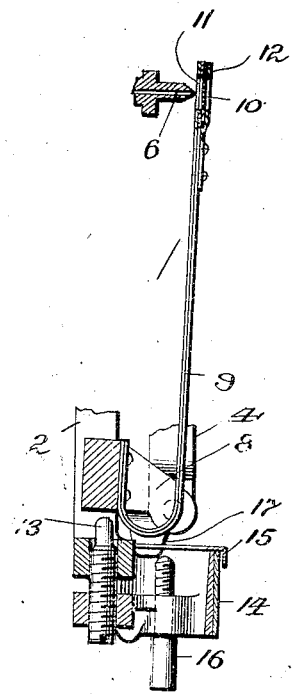

Figure 1 is a front elevation of a thermostat having my invention applied; and Fig. 2 is a sectional view of the thermostatic bar and its mount.

For purposes of illustration only, I show the device applied to a thermostat of the Johnson type. In these thermostats a supply and exhaust valve is used to admit pressure to or release it from some control device, and this valve is operated by a diaphragm through an interposed quick-throw mechanism. A pressure fluid, usually air, is supplied at a very restricted rate to act upon the diaphragm, and this pressure may be vented through a leak port capable of discharging air from the diaphragm faster than the rate of supply thereto. The leak port is controlled by a thermostatic valve so that when the thermostatic valve is closed the accumulation of pressure upon the diaphragm throws the supply and exhaust valve to one position while the opening of the leak port by the thermostatic valve causes the collapse of the diaphragm and throws the supply and exhaust valve to the reverse position. While particularly adapted for use in this class of devices, my invention is available for use wherever an automatic valve is used to control a relatively small port in the general manner illustrated.

In the drawings, 1 is the wall mount, 2 the base frame, 3 the diaphragm, 4 a lever adapted to be moved by the diaphragm and 5 is a portion of the quick-throw mechanism which actuates the supply and exhaust valve (not shown). 6 is the leak port. As already suggested the specific forms of these parts are not material as they are illustrated merely to show one method of adapting my invention.

Mounted on the lower end of the frame 2 on pivots 7 is a weighted saddle 8. This saddle carries a thermostatic bar 9 preferably of the bimetallic type adapted to flex under changes in temperature, and having an upwardly extending portion carrying a valve seat 10 preferably of celluloid, adapted to seat against the end of the leak port 6 to close the same. The valve seat 10 is mounted over a suitable aperture 11 in the end of the bar 9, and is clamped in place by a clip 12. The valve seat and clip are preferably mounted on the outer or forward face of the bar and the purpose of this is to avoid irregularities which might otherwise be occasioned by the varying thickness of the celluloid seat or the bar 9. It will be noted that because of the bent form of the bar 9 the face of the bar against which the celluloid seat 10 bears is that face of the bar which bears against the saddle 8. By insuring uniformity in the contour of the outer curve of the bar and placing the celluloid valve seat on the far side of the bar as shown, all effect of irregular thickness of the celluloid or the bar is eliminated.

The extent of downward motion of the weighted portion of the saddle 8 is limited by a stop screw 13 threaded in the lower end of the frame 2. Fast on the screw 13 is an indicator dial 14 intended to be read through an aperture in the case for the thermostat (not shown). A resilient pointer 15 carried by the frame 2 serves as a clamping member and index combined. A pin 16 threaded in the frame of the dial 14 serves as a handle to swing the same and thereby adjust the screw 13 and also as a striker which by engaging the lug 17 on the saddle 8 will tend to lift the saddle and swing the bar 9 away from the leak port. In this position the pointer reads at the designation "Off" on the dial and this is the position in which the thermostat is completely inoperative. The adjustment of the screw 13 determines the limit of descent of the weighted portion of the saddle 8, and so as soon as the saddle 8 has descended to this limit a continued outward flexing of the bar 9 will open the leak port 6. Consequently the adjustment of the screw 13 determines the temperature at which the leak port will be opened and closed by the thermostatic valve. The use of the weighted saddle insures that the thermostatic valve seat 10 will never be forced against the leak port 6 with greater force than that due to the weight of the saddle and the pivoted mounting of the saddle permits the thermostatic bar to be swung forward to give ready access to the leak port for cleaning or adjustment.

The use of a transparent valve seat permits a ready inspection of the seat and leak port while the two are in contact and the use of celluloid as material for the valve seat secures a tight sealing with a relatively light contact and eliminates any tendency to cut or bruise the end of the leak port.

A hygrostatic or any other responsive element may be mounted on the saddle in lieu of the thermostatic bar in such manner that the responsive element will by its changes of form coact with the adjustable stop 13 and leak port 6 to effect the opening and closing of the latter. As such substitution in no way affects the principle of operation of the device it is deemed unnecessary to illustrate it.

In the following claims I use the term "responsive element" to indicate any element responsive to atmospheric changes such as thermostats, hygrostats and the like.

In the following claims the term "control member" is used to indicate any part which may effect a controlling action by the contact of the thermostatic or other responsive element or some connected part, therewith. While the leak port is the commonest example of such a control member, there are many others known in this art, and the term is used broadly to indicate any member which may effect a controlling action by such contact.

Having thus described my invention, what I claim is:—

1. A valve for thermostats and the like comprising a tubular port and a celluloid valve adapted to seat against the end thereof.

2. A valve for thermostats and the like comprising a tubular port and a transparent valve adapted to seat against the end thereof.

3. A valve for thermostats and the like comprising a tubular port and a transparent celluloid valve adapted to seat against the end thereof.

4. The combination in a pressure motor control device having a leak port, of a thermostatic bar adapted to bend with variations in temperature and having an aperture in line with said leak port; and a transparent valve seat mounted on said bar at said aperture and adapted to seal said port in certain positions of said bar.

5. The combination in a pressure motor control device having a leak port, of a thermostatic bar adapted to bend with variations in temperature and having an aperture in line with said leak port; and a celluloid valve seat mounted on said bar at said aperture and adapted to seal said port in certain positions of said bar.

6. The combination with a pressure motor control device having a leak port, of a responsive element adapted to move with variations in atmospheric condition, and a transparent valve member adapted to be moved by said element into and out of sealing relation with said port.

7. The combination with a pressure motor control device having a leak port, of a responsive element adapted to move with variations in atmospheric condition, and a celluloid valve member adapted to be moved by said element into and out of sealing relation with said port.

8. The combination of a control member; a movable thermostatic bar adapted to bend into and out of contact therewith; and a yielding support for said bar adapted to relieve excessive contact pressure between said member and bar.

9. The combination of a control member; a movable thermostatic bar adapted to bend into and out of contact therewith; a yielding support for said bar adapted to relieve excessive contact pressure between said member and bar; and an adjustable stop adapted to limit the movement of said support in a direction to carry the bar into contact with said member.

10. The combination of a control member; a movable member adapted to move into and out of contact therewith; a responsive element operatively connected with said movable member to move the same under variations in atmospheric conditions; and a yielding support for said responsive element adapted to relieve excessive stress during contact of said control and movable members.

11. The combination of a control member; a movable member adapted to move into and out of contact therewith; a responsive element operatively connected with said movable member to move the same under variations in atmospheric conditions; a yielding support for said responsive element adapted to relieve excessive stress during contact of said control and movable members; and an adjustable stop adapted to limit the movement of said support in the direction to effect such contact.

12. The combination of a control member; a movable member adapted to move into and out of contact therewith; a responsive element operatively connected with said movable member to move the same under changes in atmospheric conditions; a weighted pivoted support for said element and movable member, adapted to yield to relieve excessive stress on said element and capable of being manually turned to separate said control and movable members; and an adjustable stop adapted to limit the movement of said support in a direction to effect contact of said members.

13. The combination of a control device having a leak port; a celluloid valve adapted to seal said port when in contact therewith; a thermostatic bar upon which said valve is mounted; and a yielding support for said bar adapted to prevent excessive contact pressure between said port and valve.

14. The combination of a control device having a leak port; a celluloid valve adapted to seal said port when in contact therewith; a responsive element connected with said valve and adapted to move the same into and out of contact with said port under changes in atmospheric conditions; a pivoted, weighted support for said element adapted to relieve excessive contact pressure between said valve and port; and an adjustable limit stop adapted to limit the movement of said support in a direction to effect contact between said valve and port.

15. The combination of a control member; a responsive element adapted to move into and out of contact with said control member under changes of atmospheric conditions; a pivoted weighted saddle adapted normally to support said element in operative positions; an adjustable stop adapted to vary the normal position of said saddle to adjust the action of said responsive element; and a member moving with said stop and adapted in one extreme position thereof to engage said saddle and hold the same out of its normal position to render said responsive element inoperative.

16. A valve for thermostats and the like, comprising a pair of relatively movable coacting valve members one of which is transparent at its point of seating against the other, to permit inspection of the seating action of said valve while the members thereof are in operative relation with each other.

17. A valve for thermostats and the like comprising a metallic valve member; a coacting celluloid valve member in operative relation therewith, said two valve members being movable one relatively to the other to effect an opening and closing action; and a responsive element connected with one of said valve members to effect such relative movement.

In testimony whereof I have signed my name to this specification in the presence of two subscribing witnesses.

CHARLES L. FORTIER.

Witnesses:
PAUL F. JOHNSON,
A. A. JOHNSON.